United States Patent
Cushman

[15] 3,646,982
[45] Mar. 7, 1972

[54] ENCAPSULATED FLOATING AND NONFLOATING FASTENERS

[72] Inventor: Kenneth V. Cushman, Santa Ana, Calif.

[73] Assignee: Delron Fastener Division of Rex Chainbelt, Inc., Milwaukee, Wis.

[22] Filed: Sept. 12, 1969

[21] Appl. No.: 857,418

[52] U.S. Cl. .................................. 151/41.7, 151/41.76
[51] Int. Cl. ........................................... F16b 41/00
[58] Field of Search .............. 151/41.7, 41.75, 41.76, 41.74, 151/69; 85/32 K, 53, 55, 35; 285/286

[56] References Cited

UNITED STATES PATENTS

| | | | |
|---|---|---|---|
| 2,672,659 | 3/1954 | Becker | 151/41.75 X |
| 2,789,615 | 4/1957 | Allen | 151/41.7 |
| 2,877,817 | 3/1959 | Rockwell | 151/41.7 X |
| 3,241,591 | 3/1966 | Rosan et al. | 151/41.7 |
| 3,449,004 | 6/1969 | Anderson | 151/69 X |
| 2,969,831 | 1/1961 | Eames | 85/32 M UX |

FOREIGN PATENTS OR APPLICATIONS

| | | | |
|---|---|---|---|
| 1,502,520 | 10/1967 | France | 85/53 |
| 608,911 | 9/1948 | Great Britain | 151/41.76 |
| 687,110 | 2/1953 | Great Britain | 151/41.76 |

OTHER PUBLICATIONS

" Joint Design For Ultrasonic Welding," Publication of Branson Sonic Power, January 24, 1967, 2 pp.

*Primary Examiner*—Ramon S. Britts
*Attorney*—Herzig & Walsh

[57] ABSTRACT

The invention is a fastener having an encapsulating base section providing a relatively large surface area which is attached to a surface by adhesive bonding. In one form the fastener is of the floating type. The fastener has a base section which is caged to allow the fastener to float laterally. The fastener is encapsulated with a portion extending through an aperture in the cage, the encapsulation having a circular rib to register with an opening in a surface to which the cage is secured by adhesive bonding, or sonic vibration.

7 Claims, 15 Drawing Figures

PATENTED MAR 7 1972 3,646,982

INVENTOR
KENNETH V. CUSHMAN
By Herzig & Walsh
ATTORNEYS

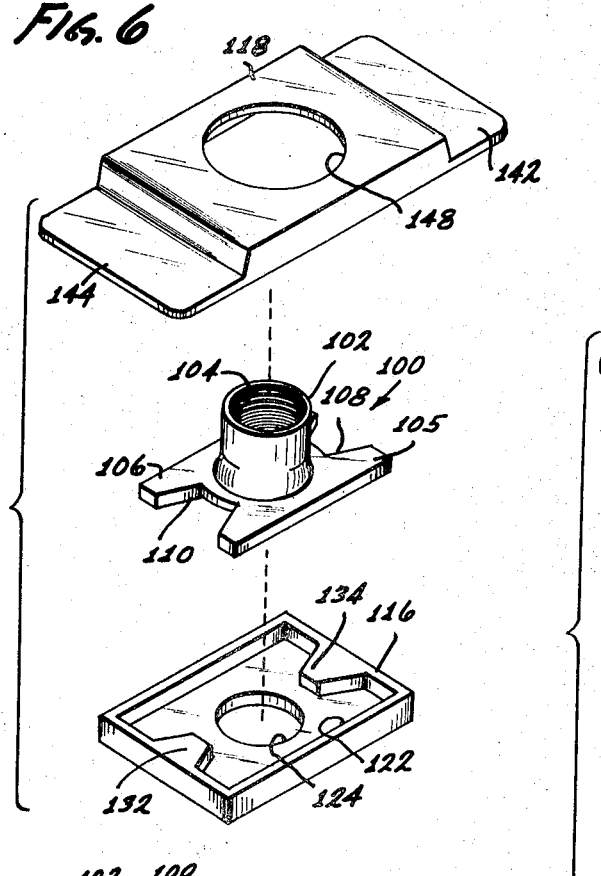
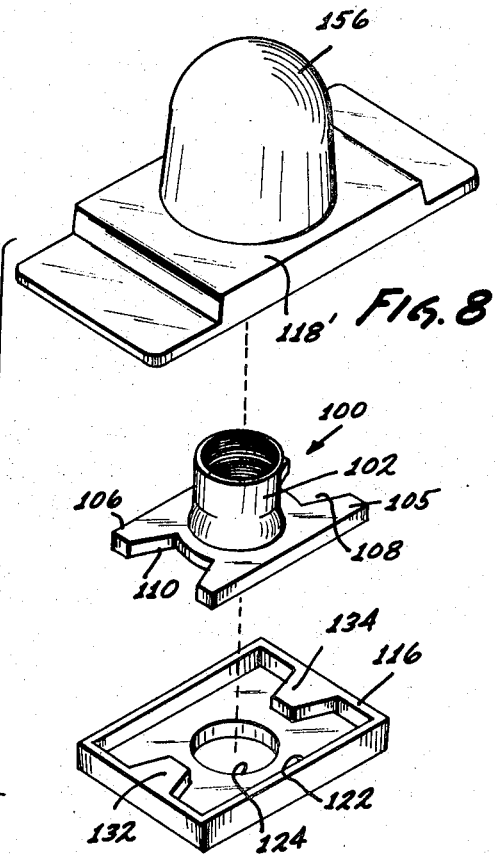
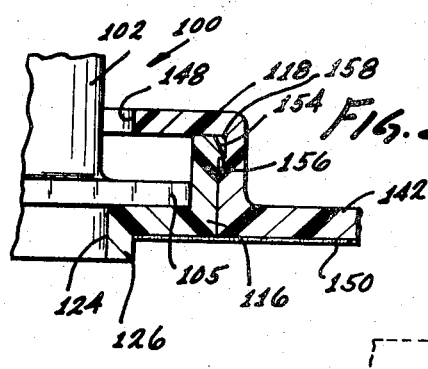
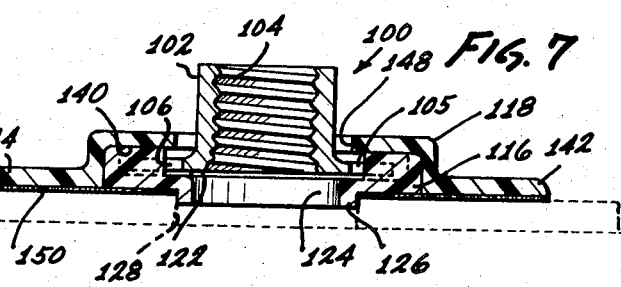
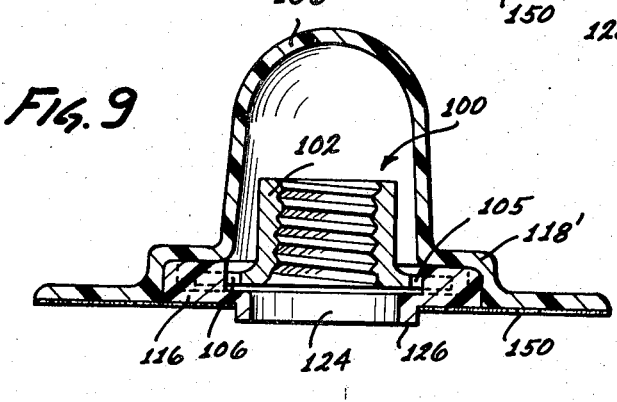

INVENTOR
KENNETH V. CUSHMAN

BY Herzig & Walsh
ATTORNEYS

ENCAPSULATED FLOATING AND NONFLOATING FASTENERS

SUMMARY OF INVENTION

The invention is a fastener (threaded stud or nut) having a base section encapsulated in plastic to provide a large surface area which is adhesively bonded to the surface to which securement is to be made. The fastener may be of the floating type. In this type of fastener, the fastener is provided with laterally extending parts or wings which are held caged in the base section so as to allow the fastener to float laterally to facilitate alignment as between fastening members, one of which is a nut. The base section is attachable to a surface to which securement is to be made by adhesive bonding.

Typically in the prior art, fasteners of this type are made of metal and are secured to the surface to which attachment is to be made by means of rivets. This type of fastener is customarily used in many types of installations and environments. Such fasteners may, for example, be used in connection with air ducts, access doors and the like which are made of various materials which have fasteners of the type described secured to them. The prior art type of fasteners, of course, typically required the drilling of holes for rivets and this operation along with the operation of actually setting the rivets is tedious and uneconomical, requiring an expenditure of large amounts of time of technicians. Furthermore, the weight of the fasteners is considerable and this becomes significant in airborne applications.

The herein invention makes available a fastener which overcomes all of the deficiencies of the prior art noted above while at the same time incorporating advantages and enhancing the capability and utility of the fastener. The invention in one form provides a floating fastener which is encapsulated in molded plastic material of suitable strength. The fastener member (stud or nut) has laterally extending parts or wings which are an integral part of the encapsulating plastic capsule which itself is secured to the surface to which attachment is to be made by adhesive bonding. Preferably, the plastic capsule itself is formed of two parts which are either adhesively bonded together or are held together by sonically vibrating both components together, the latter method requiring energy directors (raised ribs) along the mating surfaces to obtain a controlled melting area. The capsule may be formed as a single part bonded to the attachment surface.

The plastic capsule or encapsulation, of course, has an aperture or apertures to receive the fastener member that engages with the floating fastener. A further advantageous feature of the invention is that the capsule is provided with an extending circular rib or flange adapted to fit into and register with an opening in the surface to which attachment is to be made, thus enabling the encapsulated fastener to be manually positioned simply by fitting or registering this rib into the opening with the capsule then being adhesively bonded to the surface by finger pressure.

The fastener has a further distinct and advantageous capability. The prior art types as referred to in the foregoing, which require the making of holes and the use of rivets and the like, do not result in a sealed installation since it is necessary to apply caulking compound or the like to seal the area at which the fastener is secured to the work. Of course, this requires additional time, effort and expense and does not result in an effectively sealed installation. As explained in the foregoing, the fastener of this application which is wholly encapsulated is bonded to the surface to which securement is made, the bond, of course, being an extremely secure one that provides a positive sealed installation, sealing with respect to any fluids, including liquids or gases, this result coming about simply by reason of the fact that the encapsulated fastener is itself bonded to the surface.

In light of the foregoing, the primary object of the invention is to provide an improved fastener which overcomes the deficiencies and drawbacks of prior art fasteners of this type.

Another object is to provide a fastener of this type which reduces the amount of labor involved in the installation; which is easier to align and which is lighter in weight.

Another object is to provide a fastener of this type wherein the fastener member is encapsulated in a material which is light in weight and inexpensive and easy to fabricate and install.

Another object is to provide a fastener of this type provided with integral means whereby to register the fastener and hold it in position relative to an installation hole, and which provides substantial reinforcing area adapted for attachment by adhesive bonding.

Another object is to provide a fastener of this type wherein a floating fastener is encapsulated in a capsule which itself is formed of two parts bonded together with the complete unit bonded to the surface to which securement is to be made.

Another object is to provide a fastener as in the previous object wherein the floating fastener is caged in a single part bonded to a surface.

Still another object is to provide a floating fastener of this nature that will provide a complete seal from moisture and/or air, the seal resulting from the bonding of the parts of the fastener together and/or to the surface.

Other objects and additional advantages of the invention will become apparent from the following detailed description and annexed drawings, wherein:

FIG. 6 is an exploded view of a preferred form of floating nut of the invention;

FIG. 7 is a sectional view of the floating nut of FIG. 6;

FIG. 8 is a view of a slightly modified form of the floating nut;

FIG. 9 is a sectional view of the form of floating nut shown in FIG. 8;

FIG. 10 is a detail view showing the detent latch or lock between the two encapsulating parts;

Figure 1:
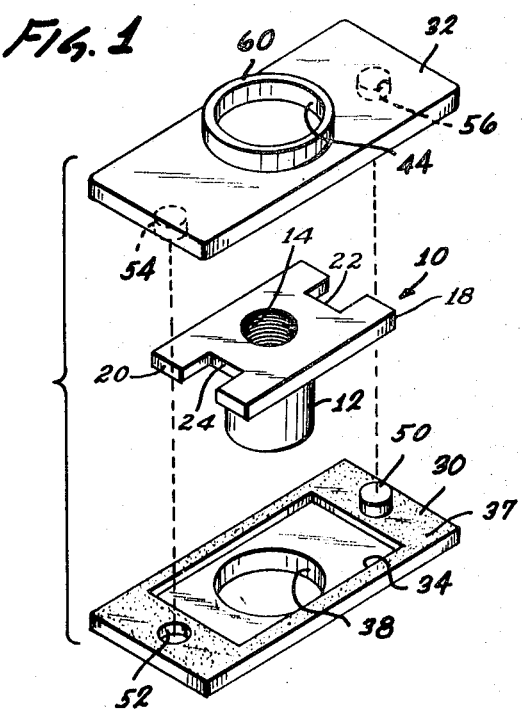
FIG. 1 is an exploded view of one form of the invention.

Referring now to FIGS. 1, 2, 3 and 4 of the drawings a floating nut type of fastener is shown wherein the nut is encapsulated in a capsule formed as described hereinafter. The nut is designated at 10 having a tubular barrel part 12 which is threaded as shown at 14. The nut 10 has laterally extending parts or wings as designated at 18 and 20 which as shown are bifurcated having cutouts as designated at 22 and 24. The extending parts or wings are flat and, of course, could have other shapes and in some forms of the device the extending part or wing might extend laterally from only one side of the nut. Ordinarily the nut is made of metal, although it might be of plastic or other materials such as aluminum. Other noncircular shapes may be used giving improved torque resistance and adequate float.

The capsule in which the nut is encapsulated is preferably formed in two parts, including a first part as designated at 30 and a second part as designated at 32. The part 30 has formed in it a rectangular cavity as designated at 34 having a depth substantially equal to the thickness of the laterally extending parts or wings of the nut 10 and these parts fit into the cavity 34. The dimensions of the cavity 34 are slightly larger at all sides than the extending parts or wings of the nut 10 so that the nut is free to float laterally in the cavity 34 in the part 30. The part 30 has a circular aperture therein as designated at 38 which is of slightly larger diameter than the barrel 12 of the nut as may be seen in FIG. 2. Around the aperture 38 is a circular rib or collar 42 as may be seen in FIG. 2.

The part 32 of the capsule is a generally flat rectangular plate fabricated of suitable material such as plastic and having a similar rectangular cavity 35 and an aperture 44 which registers with the aperture 38 and with the bore of the nut 10, when the parts are assembled. The face of the part 32 fits against the face of part 30 and they are adhesively bonded together with the nut 10 in position with its extending wing parts caged in the cavity or recess 34. Any suitable type of bonding adhesive may be used. Film or polymeric heat activated adhesive or epoxy types may be used, as well as pressure sensitive types as shown on surface 35. Preferably, the part 30 is provided with an axially extending projection 50 and a circular recess 52, the part 32 being provided with a comparable extending projection 54 and recess 56. The projections and recesses just described are mutually engageable with each other as may be seen in the figures so that the parts 30 and 32 register with each other and are held in mutually engaged and aligned relationship. Part 32 has an extending circular rib or collar 60 around the aperture 44 as shown and this rib is adapted to be received in and to engage in and register with the installation opening 62 in the member 64 to which securement or attachment is to be made. The entire capsule or encapsulated body is bonded to the surface 63 around the aperture 62 by a suitable bonding adhesive.

Figure 2:
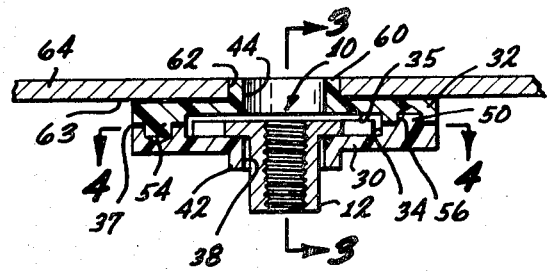
FIG. 2 is a sectional view of the floating nut of FIG. 1.
Figure 3:
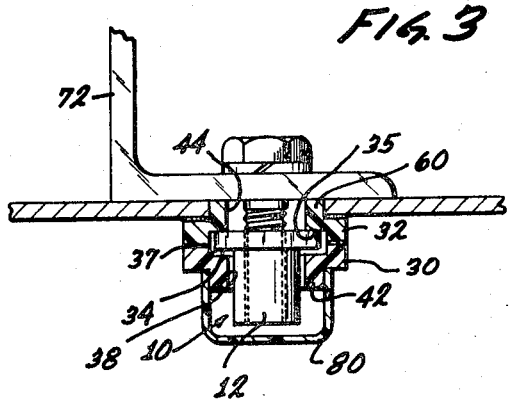
FIG. 3 is a sectional view taken along the line 3—3 of FIG. 2.

FIG. 2 shows the encapsulated nut installed on the surface 64. FIG. 3 shows a securement made to the floating nut by way of a bolt which extends through a bracket 72 to be secured into the inside of the nut 10. (The fastener may be in the form of a floating stud bolt rather than nut as described hereinafter.)

FIG. 3 shows a dome 80 which may be formed of a suitable material such as plastic which fits over the rib 42 with a tight holding fit. This dome serves as a cover and protector over the nut 10 preventing access to it and the interior of the capsule of adhesive or any other foreign material which come into contact with or into the environment of the securement. As may be observed, this dome is very easily and inexpensively constructed. It may be used with the modified form of the invention as shown in FIG. 5, as well.

Figure 4:
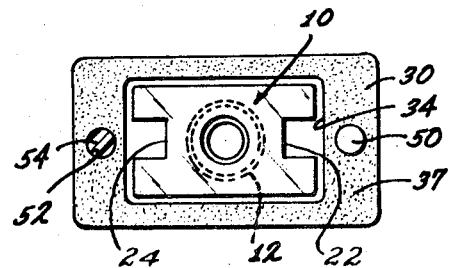
FIG. 4 is a sectional view taken along the line 4—4 of FIG. 2.
Figure 5:
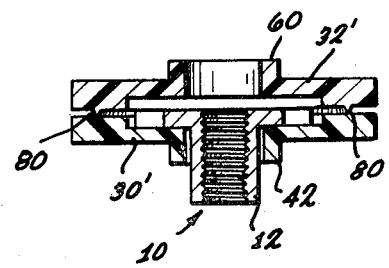
FIG. 5 is a sectional view of the invention wherein the parts are bonded together by sonic vibration.
Figure 5A:
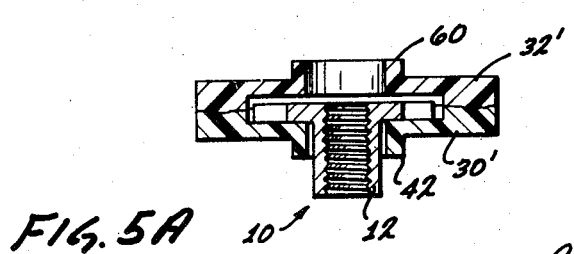
FIG. 5A is a view similar to FIG. 5 showing the parts bonded.

FIGS. 4, 5 and 5A show a form of the invention in which the parts are bonded together by sonic vibration rather than adhesively. The parts 30' and 32' are initially spaced by way of a continuous rib 80 on one part 32'. It might be on either part. It forms a sonic vibration energy director. The parts are held clamped together while the sonic vibrations are applied. The high frequency vibrations generate heat causing rib (energy director) 80 to melt. The material sets immediately when the vibrations are stopped integrally bonding the parts together, as illustrated in FIG. 5A.

From the foregoing, those skilled in the art will readily understand and appreciate the manner of fabrication, installation and utilization of the invention. Fabrication is extremely easy and inexpensive as is installation. No riveting is required and it is extremely convenient to position a line of fasteners simply by inserting the circular ribs such as the rib 60 into the installation holes which hold the capsules in position while the adhesive is setting, if a preferred adhesive requiring setup time, as opposed to contact adhesive with a pull-away protective layer, is used. The ribs provide a pilot for positioning and insure against lateral displacement of the fastener. The installation is completely sealed by way of the adhesive bond.

FIGS. 6 and 7 show a preferred modified form of the invention. In this form of the invention there is provided a floating nut 100 comprising a barrel 102 threaded as shown at 104 and having extended parts or wings as designated at 105 and 106 which are bifurcated as shown having the cutouts with tapering sides as designated at 108 and 110.

The nut is encapsulated in a capsule comprising a lower part 116 and an upper part 118. The lower part 116 is rectangular as shown having a generally rectangular cavity 122 in it of slightly greater depth than the thickness of the laterally extending parts or wings of nut 100. In the bottom of the part 116 is a circular aperture 124 which is larger than the bore of the nut 100 and is adapted to receive a fastener which attaches to the nut 100. On the bottom of the part 116 around the aperture 124 is an extending circular rib as shown at 126 adapted to be received and register in the opening 128 in the surface to which securement is to be made. Within the recess in the part 116 at the ends thereof are extending projections having tapered sides as shown at 132 and 134. The projections with tapered sides are functional as they restrict the steel nut from turning when torque pressure is applied. They work in conjunction with the sides of cavity 122 to help absorb some of the pressure.

The other part 118 is generally rectangular being longer than the part 116. It has an internal rectangular cavity as shown at 140 adapted to snugly receive the part 116 as shown in FIG. 7. The part 118 defines a cavity 140 and is preferably stepped to provide flanges 142 and 144 which extend beyond the edges of the part 116. Formed in the part 118 is the circular aperture 148 which registers with the aperture 124 in the part 116 and with the bore of the nut 100.

The parts are assembled with the nut and its extending wings fitted into the cavity 122 in the part 116 and with this part fitted into the cavity 140 of the part 118. The under surfaces of the extending flange parts 142 and 144 of part 118 are then bonded to the surface to which securement is made by means of a suitable bonding agent such as designated at 150 in FIG. 7. Thus, the installation appears as in FIG. 7 when complete. Lateral and axial float of the nut 100 is provided. It will be observed that both of the parts 118 and 116 are bonded to the surface to which attachment is made, which increases the attaching force and eliminates the need to bond the two parts of the encapsulation together. A completely sealed installation is realized as in the previous embodiments. Sonic vibration bonding may be utilized.

FIG. 8 shows a form of the invention which is like that of FIGS. 6 and 7, except for the provision of a dome designated at 156 which forms a protective closure for the nut 100.

FIG. 9 is a cross-sectional view of the form of the invention shown in FIG. 8. The dome 156 can be formed as an integral part of the part 118' or it may be formed as a cap attachment to a circular rib on the part 118' such as illustrated in FIG. 3.

FIG. 10 shows an addition to the device of FIGS. 6-9, which is the bevelled edge rib or shoulder 154 on the part 116 which cooperates with a shoulder 156 on part 142 formed by undercut groove 158. The engaging shoulders 154 and 156 form a detent latch or lock which holds the parts 116 and 142 together for convenience of handling prior to bonding to a surface.

Figure 11:
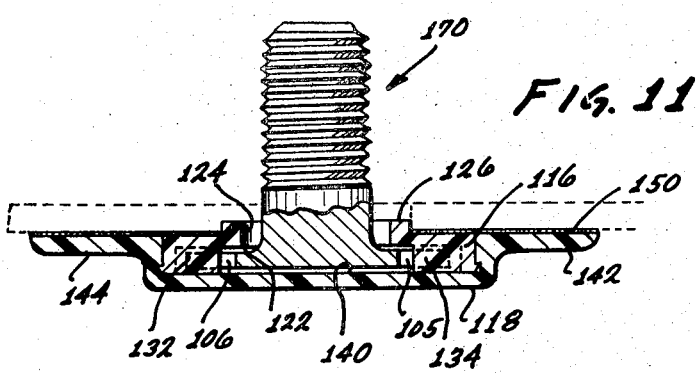
FIG. 11 is a view of a fastener similar to that of FIGS. 7 and 10 wherein the fastener is a stud rather than a nut.

FIG. 11 shows a modified form of the invention wherein the encapsulated fastener as shown at 170 is in the form of a stud bolt rather than a nut. Otherwise, the parts are like previous embodiments and are identified by similar reference numerals. It will be noted that the rib 126 for registering in an aperture in the surface to which attachment is made is around the shank of the stud bolt.

Figure 12:
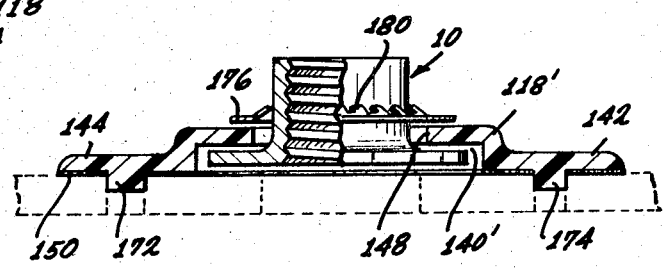
FIG. 12 is a sectional view of a modified form of fastener.

FIG. 12 shows another modified form of the invention wherein the fastener is shown as a floating nut 10 which may be like the nut of FIG. 1 or like that of FIG. 6. The base section of the nut is encapsulated in a part which is designated 118' which is similar to that of previous embodiments except that a single part is utilized for encapsulating the floating fastener. It has extending projections 172 and 174 that are received in and register in apertures in the surface to which attachment is made to position the fastener. The part 118' is adhesively bonded to the attachment surface as in previous embodiments. To prevent the nut 10 from dropping out of the cavity 140' in the part 118' before installation is made, there is provided a washer 176, the inner part of which is bowed as shown and the peripheral edges of the opening in the washer are serrated as shown at 180. The washer is a spring washer and is held frictionally on the shank of the nut 10 and thus prevents the nut from dropping out through the aperture 148 in the part 118'.

Figure 13:
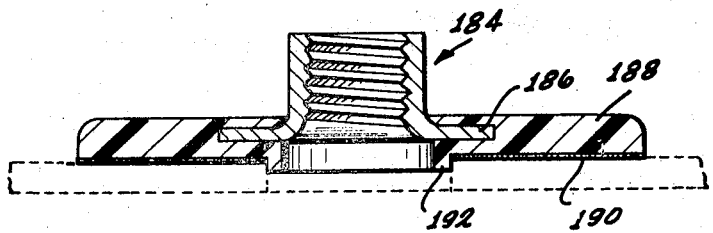
FIG. 13 is a sectional view of a non floating form of fastener.
Figure 14:
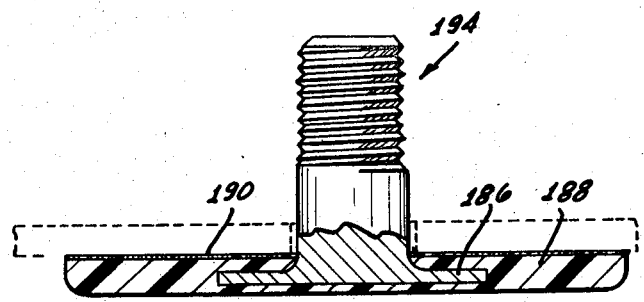
FIG. 14 is a sectional view of non floating forms of fasteners which are stud bolts rather than nuts.

The fastener of the invention may be of a nonfloating type as shown in FIGS. 13, 14 and 15. Many of its advantageous characteristics can be realized in a fastener of a nonfloating type as well as in a floating type. As with the floating types, the nonfloating type may be in the form of a threaded nut or a threaded stud bolt as illustrated in FIGS. 13, 14 and 15. In FIG. 13 the fastener is shown as a threaded nut 184 having an extending base section 186 which may have various shapes such as round or otherwise. The nut and its base section preferably, and typically, are made of metal in order to withstand whatever forces are applied thereto. The base section 186 is encapsulated in a plastic material as designated 188 which may have a thickness such as illustrated relatively in FIG. 13 and of a size to provide for appropriate reinforcing capabilities to the surface to which attachment is to be made and to provide a suitable area for adhesive bonding, the adhesive bond being illustrated by numeral 190. In the form of the fastener shown, the encapsulating part 188 has an extending rib 192 which registers or indexes in the opening in the surface to which attachment is to be made and that aligns with the bore in the nut 184. As may be seen, the fastener as described realizes the capability of being attached by adhesive bonding; the relatively large area of the plastic part 188 provides appropriate reinforcing and these strengths are realized without excessive weight, since only the nut 184 itself is made of metal.

FIG. 14 shows a construction similar to that of FIG. 13, except that the fastener is shown as a threaded stud bolt 194 rather than a nut. FIG. 14 shows the stud bolt 194 extending through an opening or aperture of larger size in the surface to which attachment is to be made. An extending rib, such as shown at 196, can be provided on the part 188 to register and index in the opening in the surface to which attachment is made.

From the foregoing, those skilled in the art will readily understand the nature of the construction of the invention and its operation and the manner in which it achieves and realizes all of the objects and advantages as set forth in the foregoing, as well as the many additional advantages that are apparent from the detailed description and/or drawings.

The foregoing disclosure is representative of preferred forms of the invention and is to be interpreted in an illustrative rather than a limiting sense, the invention to be accorded the full scope of the claims appended hereto.

1. A floating type of fastener comprising a threaded member having retaining means, means to cage said retaining means while allowing the member to float laterally, said caging means having an aperture having said member extending therethrough, said caging means being constructed to completely enclose said retaining means except for clearance between said aperture and threaded member, said caging means comprising a first part having a recess and a second part overlying the first part in a position to retain the threaded member in the recess, both of said parts being relatively flat and at least one part presenting a flat area substantially larger than said retaining means for securement to a surface and said first and second parts having flat surfaces bonded together and mutually engageable means engageable to hold the members in alignment.

2. A floating fastener as in claim 1 wherein said caging means has an extending rib around said aperture adapted to engage in and register with an opening in a surface to which the fastener is attached.

3. A floating fastener as in claim 1 including means to attach said flat area of said caging means to a surface to which securement is to be made.

4. A floating fastener as in claim 3 wherein said caging means has a removable closure member for said aperture.

5. A floating fastener as in claim 4 wherein said caging means has an aperture having an extending circular rib around it, for registering in a hole in said surface.

6. A floating type of fastener comprising a threaded member having retaining means, means to cage said retaining means while allowing the member to float laterally, said caging means having an aperture having said member extending therethrough, and said caging means being constructed to completely enclose said retaining means, except for clearance between said aperture and threaded member, said caging means comprising a first part having a recess and a second part overlying the first part in a position to retain the threaded member in the recess, both of said parts being relatively flat and at least one part presenting a flat area substantially larger than said retaining means for securement to a surface, said second part having a cavity having said first part fitting therein, said first and second parts having flat areas lying in a common plane and bonded to a surface.

7. A floating fastener as in claim 6 wherein said members have interengaging means to hold them in caging relationship prior to securement to a surface.

* * * * *